W. H. MACY, Jr.
Apparatus for Expelling Substances from Packages.
No. 223,743. Patented Jan. 20, 1880.

UNITED STATES PATENT OFFICE.

WILLIAM H. MACY, JR., OF NEW YORK, N. Y., ASSIGNOR TO JOHN H. POOL & MACY, OF SAME PLACE.

APPARATUS FOR EXPELLING SUBSTANCES FROM PACKAGES.

SPECIFICATION forming part of Letters Patent No. 223,743, dated January 20, 1880.

Application filed December 4, 1879.

*To all whom it may concern:*

Be it known that I, WILLIAM H. MACY, Jr., of the city, county, and State of New York, have invented certain new and useful Improvements in Apparatus for Emptying Packages of Tallow, Lard, and other Substances, of which the following is a specification.

The object of my invention is to provide an apparatus for expeditiously removing or discharging tallow, lard, or other similar substances from hogsheads, tierces, or other packages without applying heat thereto.

My invention consists, essentially, in an apparatus composed of a rotary shaft arranged in suitable bearings and provided with a series of blades or scoops, and a carriage or support for a hogshead, tierce, or other cask or package, arranged concentrically in line with said shaft, one of said devices being longitudinally movable relative to the other, to enable the scoops or blades to act upon the material, and the scoops or blades being arranged in such oblique position upon the said shaft that the rotation of the latter will draw the contents from the hogshead, tierce, or other package.

The shaft and the carriage or support are preferably arranged in an approximately horizontal position, and the shaft is mounted in stationary bearings, while the carriage or support is adapted to be moved relatively thereto. I may also combine with said carriage or support a device for preventing the turning of the barrel, tierce, or other package by the rotation of the shaft.

Figure 1:
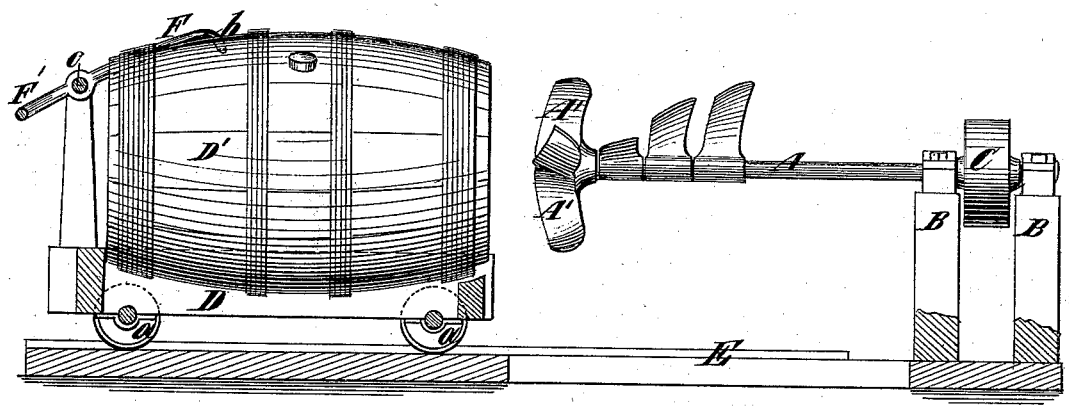
Figure 2:
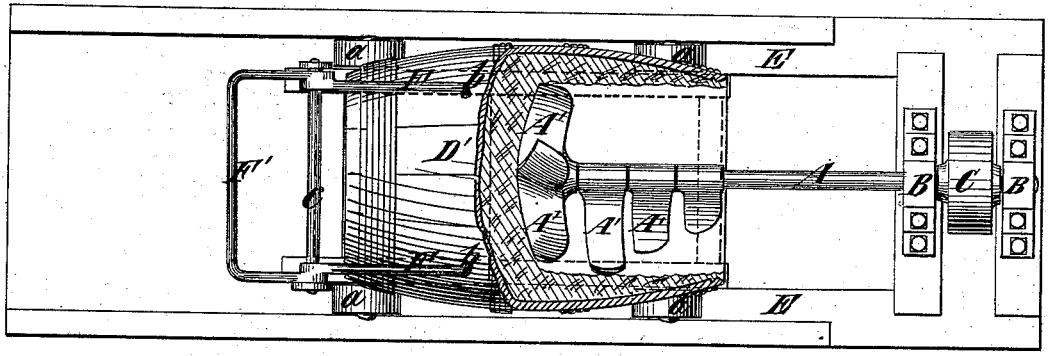

In the accompanying drawings, Figure 1 represents a side view of an apparatus embodying my invention and a barrel or cask upon the carriage or support; and Fig. 2 represents a plan thereof, a portion of a tierce or cask being broken away.

Similar letters of reference designate corresponding parts in both figures.

A designates a shaft, supported in bearings B, and provided with a pulley, C, through which a rotary motion may be imparted to it.

D designates a carriage or support for a hogshead, tierce, or other package, and D' designates such a hogshead or tierce mounted thereon. As here represented, the shaft and the carriage are arranged approximately horizontally, and so that the center of the rotary shaft is about concentric with the center of the hogshead or tierce.

E designates a bed or foundation, upon which the bearings B are erected, and also forming the additional purpose of a track or way for said carriage, which is in this instance adapted to be moved longitudinally toward and from the shaft A. To facilitate its movements the carriage or support D is provided with wheels or rollers *a*, which rest upon and are guided by the foundation E.

Upon the shaft A are arranged a series of scoops or blades, A', which are arranged in such oblique position upon the shaft that the rotation of the latter serves to draw the material from the package. As here represented, the said shaft has upon its end four scoops or blades arranged in the same transverse plane, and the remaining scoops or blades are arranged spirally upon the shaft. As the carriage or support D, bearing upon it the package D', is moved toward the shaft, the scoops or blades A' act upon the material contained therein, loosening it and carrying it forward to the front end of the package, where it falls through an opening to any suitable receptacle provided for it.

In order to prevent the package D' from turning by the motion of shaft A, I employ a forked dog consisting of bars F, having pointed ends *b* to strike into and hold the package. These arms are pivoted to a shaft, *c*, and are connected at the rear ends by a cross-bar, F', which also serves as a handle by which to move the carriage or support longitudinally. Instead of being arranged horizontally, the apparatus might be arranged on an incline or vertically, and the package might be held stationary, while the shaft has a longitudinal movement as well as a rotary movement.

What I claim as my invention, and desire to secure by Letters Patent, is—

1. The combination of a rotary shaft arranged in suitable bearings and having a series of scoops or blades secured upon it, and a carriage or support for a cask or other package arranged concentrically in line with said shaft, one of said devices having a longitudinal movement toward and from the other, and the scoops or blades being arranged in such oblique positions upon the shaft that the rotation of the latter serves to draw material from the cask or package, substantially as specified.

2. The combination, with an approximately horizontal rotary shaft, of a carriage or support for a cask or other package, arranged concentrically with said shaft and having a longitudinal movement relatively thereto, and a series of scoops or blades arranged in such oblique positions upon said shaft that the rotation of the latter serves to draw material from said cask or package, substantially as specified.

3. The combination, with a rotary shaft having a series of scoops or blades secured upon it, of a carriage or support for a cask or other package, arranged concentrically in line with said shaft and having a longitudinal movement relatively thereto, and a dog or device for precluding said cask or package from turning, substantially as specified.

4. The combination, with the carriage or support D, of the forked dog or bar F and cross-bar F', which serves as a handle for moving said carriage or support, substantially as specified.

WM. H. MACY, JR.

Witnesses:
FREDK. HAYNES,
E. P. JESSUP.